(12) United States Patent
Welchko et al.

(10) Patent No.: US 7,843,156 B2
(45) Date of Patent: Nov. 30, 2010

(54) METHOD AND APPARATUS FOR ACTIVE VOLTAGE CONTROL OF ELECTRIC MOTORS

(75) Inventors: Brian A Welchko, Torrance, CA (US); Keith A Rodman, Torrance, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 677 days.

(21) Appl. No.: 11/769,856

(22) Filed: Jun. 28, 2007

(65) Prior Publication Data

US 2009/0001915 A1 Jan. 1, 2009

(51) Int. Cl.
*H02P 1/04* (2006.01)
(52) U.S. Cl. .............. 318/461; 318/472; 318/504; 318/801
(58) Field of Classification Search ............ 318/461, 318/472, 504, 801
See application file for complete search history.

(56) References Cited

U.S. PATENT DOCUMENTS

| | | | | |
|---|---|---|---|---|
| 3,801,888 A | * | 4/1974 | Faulkner | 318/471 |
| 3,969,659 A | * | 7/1976 | Thode | 318/823 |
| 4,607,205 A | * | 8/1986 | Kito et al. | 318/778 |
| 5,107,151 A | * | 4/1992 | Cambier | 327/432 |
| 5,994,869 A | * | 11/1999 | Becerra | 318/729 |
| 2004/0066156 A1 | * | 4/2004 | Makaran et al. | 318/66 |
| 2005/0127865 A1 | * | 6/2005 | Kiuchi et al. | 318/802 |
| 2006/0142901 A1 | * | 6/2006 | Frankel et al. | 700/300 |
| 2006/0181239 A1 | * | 8/2006 | Galli et al. | 318/805 |

* cited by examiner

*Primary Examiner*—Walter Benson
*Assistant Examiner*—Kawing Chan
(74) *Attorney, Agent, or Firm*—Ingrassia Fisher & Lorenz, P.C.

(57) ABSTRACT

Methods and apparatus are provided for dynamic voltage control of electric motors. An inverter provides an output voltage to an electric motor based on a gate voltage. The method includes determining a speed of the electric motor and modifying the gate voltage based on the speed of the electric motor. The apparatus includes a gate drive circuit and a controller coupled to the gate drive circuit. The gate drive circuit provides a gate voltage to a switch network, and the switch network produces the output voltage in response to the gate voltage. The controller modifies the gate voltage based on a speed of the electric motor.

12 Claims, 2 Drawing Sheets

US 7,843,156 B2

METHOD AND APPARATUS FOR ACTIVE VOLTAGE CONTROL OF ELECTRIC MOTORS

TECHNICAL FIELD

The present invention generally relates to controlling electric drives, and more particularly relates to apparatus and methods for voltage control of electric motors.

BACKGROUND OF THE INVENTION

A voltage source inverter may be used to control the phase currents of a three-phase alternating current (AC) motor, such as incorporated in electric drives. Some voltage source inverters employ a switching circuit (e.g., based on semiconductor switches) to regulate these phase currents and thus, control the fundamental output voltage component of the voltage source inverter. The capacity to activate/deactivate any given switch of the voltage source inverter is typically provided by a gate drive circuit, which provides a gate drive supply voltage to the switch.

Most conventional gate drive circuits are designed with a fixed supply voltage, and this supply voltage is typically selected based on a balance of considerations to account for a number of performance trade-offs. These trade-offs may impact delays, required dead-time, transient response, fault response, or the like. Additionally, the voltage source inverter may be required to operate over a wide temperature range and with wide fluctuations of the main power supply voltage. The supply voltage for the gate drive circuit is often selected such that the voltage source inverter can operate over most, if not all, of these operating conditions and differences resulting from manufacturing tolerances.

In general, the supply voltage for the gate drive circuit is typically maintained at a fixed level below a maximum value for periods of elevated high voltage direct current (DC) supply voltage levels (e.g., elevated DC link voltage). At times, the voltage source inverter may encounter thermal stresses, and during periods of low output electrical frequency, the thermal stresses may not be evenly distributed among the inverter switches. For example, uneven distribution of thermal stresses may occur when the thermal time constant of the inverter is slower than the change in the electrical output angle of the inverter. Typically, this occurs for output electrical fundamental frequencies less than about 3 Hz to a stall condition at about 0 Hz. To thermally protect the inverter switches, the electrical output of the voltage source inverter may be restricted. This generally reduces the current carrying capacity of the inverter. In the past, the silicon die area of the inverter may be increased to increase the current carrying capacity and thereby offset this reduction.

Accordingly, it is desirable to provide methods and apparatus for dynamically controlling a voltage source inverter that reduces conduction losses during low-speed, high-current conditions. In addition, it is desirable to provide methods and apparatus for increasing the current carrying capacity of a voltage source inverter while limiting the losses for a non-varying silicon die area of the inverter. Furthermore, other desirable features and characteristics of the present invention will become apparent from the subsequent detailed description and the appended claims, taken in conjunction with the accompanying drawings and the foregoing technical field and background.

SUMMARY OF THE INVENTION

Methods and apparatus are provided for controlling a voltage source inverter that reduces voltage distortion effects in electric motors. In an exemplary embodiment, a method for controlling an electric motor via an inverter is provided. The inverter is configured to receive a gate voltage and further configured to provide an output voltage to the electric motor in response to the gate voltage. The method includes, but is not necessarily limited to, modifying the gate voltage based on a speed of the electric motor.

In another exemplary embodiment, a method for controlling an inverter is provided. The inverter is operable to provide an output voltage to an electric motor. The method includes, but is not necessarily limited to, determining if a commanded output frequency of the inverter does not exceed a first pre-determined threshold, determining, if the commanded output frequency does not exceed the first pre-determined threshold, if a commanded stator current of the inverter exceeds a second pre-determined threshold, producing a first command if the commanded stator current exceeds the second pre-determined threshold, and producing a second command if the commanded stator current does not exceed the second threshold. The inverter receives a first gate voltage in response to the first command and provides the output voltage in response to the first gate voltage. The inverter receives a second gate voltage in response to the second command and provides the output voltage in response to the second gate voltage. The first gate voltage is greater than the second gate voltage.

In another exemplary embodiment, an inverter is provided including, but not necessarily limited to, a gate drive circuit having an input and having an output configured to couple to a switch network, and a controller coupled to the input of the gate drive circuit. The gate drive circuit is configured to produce provide a gate voltage to the switch network, and the switch network is operable to produce an output voltage to an electric motor in response to the gate voltage. The controller is configured to modify the gate voltage based on a speed of the electric motor.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Methods and apparatus are provided for dynamically changing and regulating a gate drive voltage of an inverter providing an output voltage to an electric motor. In one embodiment, the gate drive voltage is increased during low-speed, high-current conditions to reduce conduction losses of the inverter and support an increased current-carrying capacity of the inverter, particularly when inverter thermal losses (e.g., associated with elevated current levels) are not evenly distributed in the inverter. Additionally, lower gate drive voltages may be employed during inverter conditions of higher speeds and elevated high-voltage supply conditions to increase the operating margin of the inverter switches during fault conditions.

Figure 1:
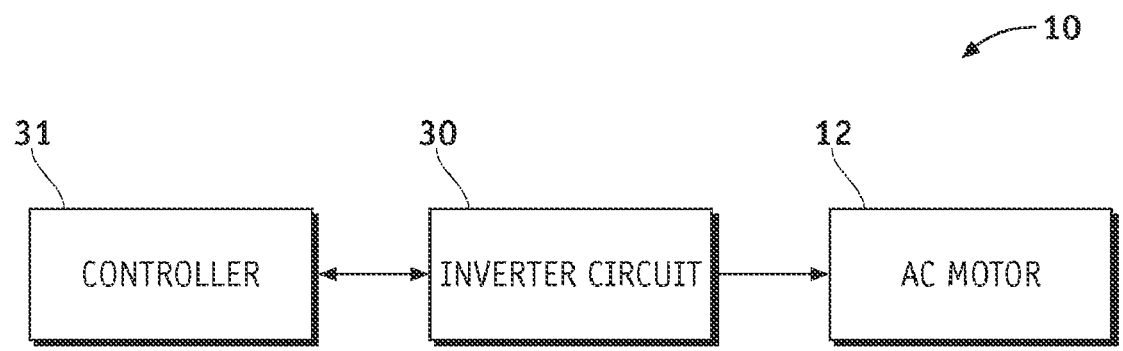
FIG. 1 is a block diagram of an electric drive system in accordance with an exemplary embodiment of the present invention.

Referring to FIG. 1, an electric drive system 10 is shown in accordance with an exemplary embodiment of the present invention. The electric drive system 10 comprises a controller 31, an inverter circuit 30 having an input coupled to an output of the controller 31, and an electric motor 12 (e.g., an alternating current (AC) motor) coupled to an output of the inverter circuit 30. Generally, the controller 31 controls the switching action of the inverter circuit 30, and the inverter circuit 30 produces an AC voltage for driving the electric motor 12. The electric motor 12 may be any conventional AC motor (e.g., a permanent magnet machine or the like) commonly used in vehicles (e.g., hybrid electric vehicles or the like).

In one embodiment, the controller 31 produces a pulse width modulation (PWM) signal for controlling the switching action of the inverter circuit 30. The controller 31 may also receive a signal (e.g., another PWM signal) and produce the PWM signal to control the inverter circuit 30 therefrom. Additionally, the controller 31 monitors various operating parameters and conditions of the electric drive system 10. For example, the controller 31 monitors the levels of a main high voltage (e.g., a direct current (DC) supply voltage) supplied to the inverter circuit 30 for fluctuations (e.g., for an elevated value), the inverter temperature, various commanded values and actual values (e.g., a commanded output frequency of the inverter circuit 30 and a commanded output current of the inverter circuit 30), or the like.

The inverter circuit 30 receives the PWM signal and converts this signal to a voltage waveform for driving the electric motor 12. In one embodiment, the inverter circuit 30 is a three-phase voltage source inverter. The inverter circuit 30 converts a supply voltage ($V_{dc}$) into an AC voltage, which is used to drive the electric motor 12. For example, the inverter 14 produces three-phase voltages (e.g., $V_a$, $V_b$, $V_c$) from a supply potential (e.g., a battery potential or DC bus voltage) based on the PWM signal and drives the electric motor 12 with the three-phase voltages. The inverter circuit 30 can also vary the amount of voltage applied to the electric motor 12, thus allowing the controller 31 to control the phase currents of the electric motor 12.

It will be appreciated that embodiments of the invention described herein may comprise one or more conventional processors and stored program instructions that control the one or more processors to implement, in conjunction with certain non-processor circuits (e.g., switching network), some, most, or all of the functions for controlling/modifying signals supplied to the inverter circuit 30 as described herein. As such, these functions may be interpreted as steps of a method for controlling an inverter. Alternatively, some or all functions could be implemented by a state machine that has no stored program instructions, or in one or more application specific integrated circuits (ASICs), in which each function or some combinations of certain of the functions are implemented as custom logic. Additionally, a combination of the two approaches could be used.

Figure 2:
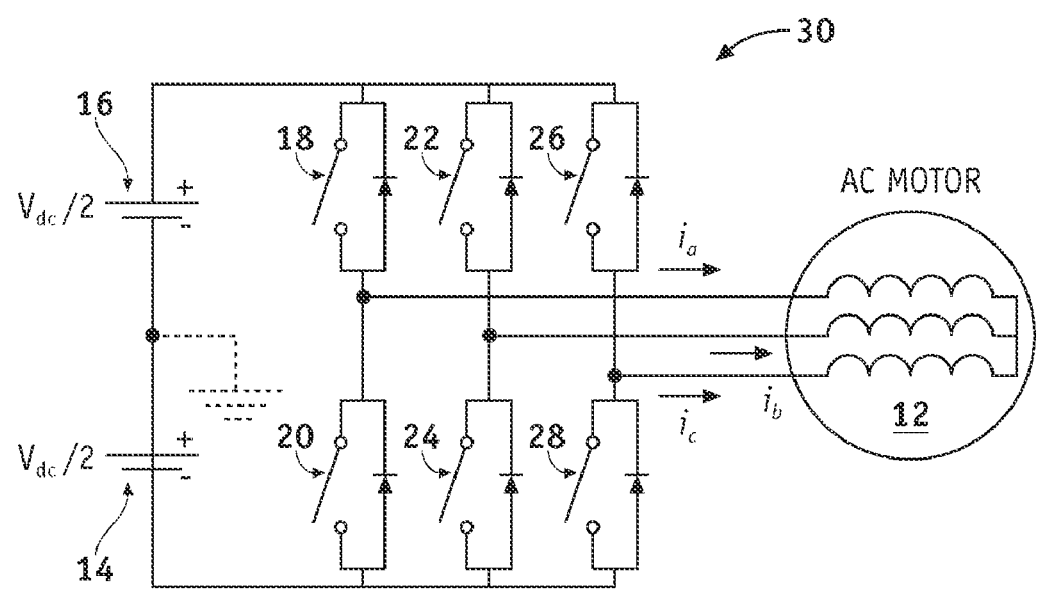
FIG. 2. is a circuit diagram of the inverter circuit shown in FIG. 1.

FIG. 2 is a circuit diagram of the inverter circuit 30 shown in FIG. 1. The inverter circuit 30 is a three-phase circuit coupled to the electric motor 12. More specifically, the inverter circuit 30 comprises voltage source 14, 16 and a switch network having a first input coupled to the voltage source 14, 16 and an output configured to be coupled to the electric motor 12. Although the voltage source 14, 16 is shown as a distributed DC link with two series sources (e.g., a first series source 14 and a second series source 16), a single voltage source may be used.

The switch network comprises three pairs of series switches with antiparallel diodes (i.e., antiparallel to each switch) corresponding to each of the phases. Each of the pairs of series switches comprises a first switch 18, 22, and 26 having a first terminal coupled to a positive electrode of the voltage source 14, 16 and a second switch 20, 24, and 28 having a first terminal coupled to a negative electrode of the voltage source 14, 16 and having a second terminal coupled to a second terminal of the first switch 18, 22, and 26, respectively. Although not shown, the controller 31, shown in FIG. 1, may also monitor the switching cycle of the switches 18, 20, 22, 24, 26, and 28 and the output voltage of the inverter circuit 30.

In one embodiment, each of the switches 18, 20, 22, 24, 26, and 28 is a combination of a transistor (e.g., an insulated gate bipolar transistor (IGBT), a metal oxide semiconductor field effect transistor (MOSFET), or the like) coupled in anti-parallel with a diode. This switch-diode combination allows the switches 18, 20, 22, 24, 26, and 28 to bi-directionally conduct current and uni-directionally block voltage. To regulate phase currents ($i_a$, $i_b$, $i_c$) of the electric motor 12, a switch pair (e.g., for a particular phase leg) is controlled using a pulse width modulation (PWM) method such that one of the switches in the switch pair is "on" and the other switch in the switch pair is "off." For example, the switch pair in a phase leg of the three-phase voltage source inverter operates in a complimentary fashion such that one switch of the switch pair is always "on" and the other switch of the switch pair is always "off."

In practice, a blanking time, or dead-time, is typically inserted during each transition of a switching state of the voltage source inverter. The dead-time is a short interval during which both switches are gated "off." This prevents both switches in a particular phase leg from simultaneously being "on," which could short-circuit the voltage source inverter. Conventional PWM methods typically switch two phases of the inverter during any given switching cycle with the remaining phase having one switch continuously "on." The result of switching action is to produce the three-phase voltages (e.g., $V_a$, $V_b$, $V_c$) from the supply potential (e.g., DC bus voltage) based on the PWM signal and drive the electric motor 12 with the three-phase voltages.

Figure 3:
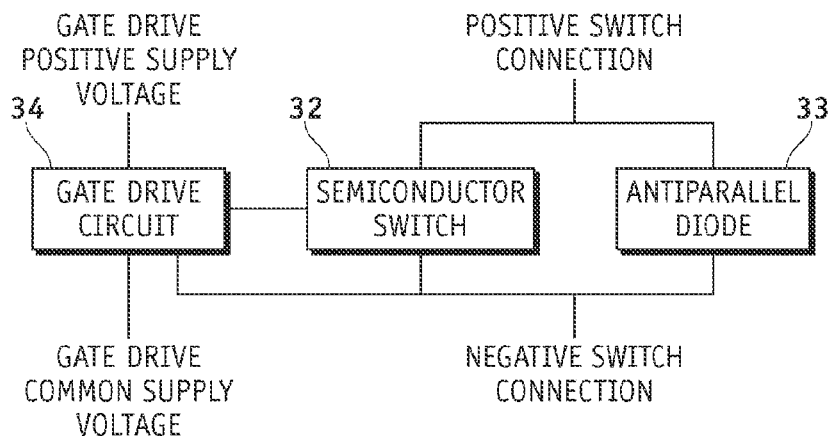
FIG. 3 is a block diagram illustrating a portion of the inverter circuit shown in FIG. 2 in greater detail.

FIG. 3 is a block diagram illustrating a portion of the inverter circuit 30 shown in FIG. 2 in greater detail. Referring to FIGS. 2 and 3, any one of the switches 18, 20, 22, 24, 26, and 28 may be configured as a semiconductor switch 32 having first and second terminals coupled in anti-parallel with a diode 33, in one embodiment. For example, in one configuration of the switch 18 (or of the switches 22 and 26), the first terminal (e.g., a collector) of the semiconductor switch 32 is configured to couple to a positive switch connection (e.g., the positive electrode of the voltage source 14, 16) and the second terminal (e.g., an emitter) of the semiconductor switch 32 is configured to couple to a negative switch connection (e.g., one of the windings of the electric motor 12). In this example, the diode 33 has an anode coupled to the second terminal of the semiconductor switch 32 and has a cathode coupled to the first terminal of the semiconductor switch 32. In another example, in one configuration of the switch 20 (or of the switches 24 and 28), the first terminal (e.g., the collector) is configured to couple to a positive switch connection (e.g., one of the windings of the electric motor 12) and the second terminal (e.g., the emitter) of the semiconductor switch 32 is configured to couple to a negative switch connection (e.g., the negative electrode of the voltage source 14, 16).

The control capacity to turn "on" or turn "off" any of the switches 18, 20, 22, 24, 26, and 28 is provided by a gate drive circuit. In this embodiment, a gate drive circuit 34 is coupled to the semiconductor switch 32 (e.g., at the gate or base of the semiconductor switch 32). The gate drive circuit 34 is powered by a power supply (not shown). For example, the gate drive circuit 34 is configured to couple to a positive terminal and a common terminal of the power supply, and thereby receives a gate drive positive supply voltage and a gate drive common supply voltage from the power supply. The gate drive positive supply voltage and/or the gate drive common supply voltage are independently controllable from the main power supply voltage (e.g., the DC bus voltage) to the semiconductor switch 32 and diode 33. Based on the gate drive positive supply voltage and the gate drive common supply voltage, the gate drive circuit provides a gate voltage to the semiconductor switch 32. Additionally, the gate drive circuit 34 may contain any necessary signal processing (e.g., isolation, level-shifting, or the like), additional fault protection circuitry, or the like, to control the semiconductor switch 32 and diode 33.

In general, a higher gate drive supply voltage causes the semiconductor switch 32 to achieve a deeper state of saturation. This reduces the on-state resistance of the switch. Reducing the on-state resistance of the switch reduces the conduction losses in the switch for a given current level. During periods of low output electrical frequency (e.g., during low speeds of the electric motor 12), the thermal stresses are generally not evenly distributed among the switches 18, 20, 22, 24, 26, and 28. Typically, this occurs when the thermal time constant of the inverter circuit 30 is slower than the change of electrical output angle (e.g., for output electrical fundamental frequencies less than about 3 Hz).

In one embodiment, the electrical output of the inverter circuit 30 is restricted (e.g., by the controller 31) at low output frequencies (e.g., less than about 3 Hz) to account for the uneven distribution of thermal stresses among the switches 18, 20, 22, 24, 26, and 28. This typically results in a reduced current-carrying capacity of the inverter circuit 30 at low output frequencies. To increase the current-carrying capacity of the inverter circuit 30, while maintaining this operating margin, conduction losses can be decreased by actively increasing the gate voltage provided by the gate drive circuit 34 to the semiconductor switch 32. Decreasing the conduction losses generally permits an increase in the current-carrying capacity of the semiconductor switch 32 while limiting the losses associated with a given silicon area of the inverter circuit 30.

By monitoring the operating parameters and conditions of the electric motor 12, the controller 31 can compare one or more of these operating parameters and conditions with one or more thresholds to provide a basis for commanding a gate voltage to be produced by the inverter circuit 30. In one embodiment, the gate drive positive supply voltage and/or the gate drive common supply voltage is regulated (e.g., directly or indirectly by the controller 31) in response to the commanded gate voltage.

By actively controlling the gate voltage provided by the gate drive circuit 34, and thus controlling the associated conduction losses, the current-carrying capacity of the inverter circuit 30 may be increased during periods of operation when the inverter circuit 30 is thermally limited (e.g., during operation of the inverter circuit 30 at low output frequencies, which is associated with low operating speeds of the electric motor 12). In an exemplary embodiment, the gate voltage provided by the gate drive circuit 34 is actively controlled to maximize the current-carrying capacity of the inverter circuit 30 without compromising the operating margins which may occur due to an elevated supply voltage (e.g., based on the gate drive positive supply voltage and/or the gate drive common supply voltage) to the gate drive circuit 34.

Figure 4:
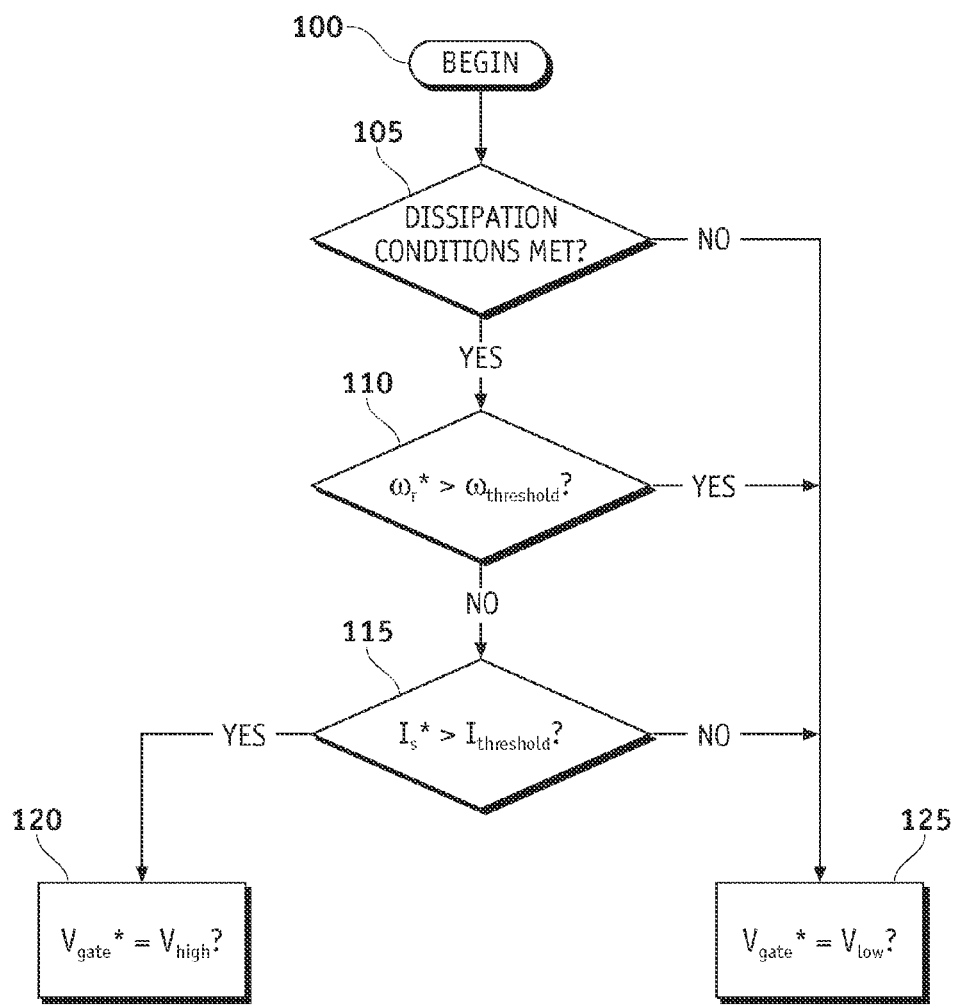
FIG. 4 is a flow diagram of a method for controlling an inverter in accordance with an exemplary embodiment of the present invention.

FIG. 4 is a method 100 for controlling an inverter in accordance with an exemplary embodiment of the present invention. In general, a gate voltage received by the inverter is modified based on a speed of the electric motor. In one embodiment, operating conditions of the electric motor are compared with one or more thresholds to provide a basis for selecting a commanded gate voltage. Referring to FIGS. 1-4, a determination is made as to if one or more operating conditions of the electric motor 12 meets dissipation conditions, as indicated at step 105. During operation of the inverter circuit 30, the inverter circuit 30 may have an inverter temperature. The controller 31 can compare the current DC supply voltage with a pre-determined elevated voltage level and compare the inverter temperature with a pre-determined temperature to determine if the electric motor 12 and/or inverter circuit 30 are operating in a state that can support an increased gate voltage. For example, for sufficient dissipation of gate drive losses due to an elevated gate voltage, the DC supply voltage should be less than the pre-determined elevated voltage level and the inverter temperature should be less than the pre-determined elevated temperature. The values of the pre-determined elevated voltage level and the pre-determined elevated temperature may be selected based on the historical performance of the electric motor 12 and/or the inverter circuit 30 under various conditions, one or more device tolerances, system performance requirements, or the like.

If the dissipation conditions are met, a commanded output frequency ($\omega_r^*$) of the inverter circuit 30 is compared with a pre-determined frequency threshold ($\omega_{threshold}$) to determine if the commanded output frequency does not exceed this frequency threshold, as indicated at step 110. For example, if the DC supply voltage is less than the pre-determined elevated voltage level and the inverter temperature is less than the pre-determined elevated temperature, the commanded output frequency is compared with the frequency threshold. If the commanded output frequency does not exceed the frequency threshold, a commanded stator current ($I_s^*$) of the inverter circuit 30 is compared with a current threshold ($I_{threshold}$) to determined if the commanded stator current exceeds the current threshold, as indicated at step 115. In one embodiment, the current threshold is modeled with a hysteresis, and the amplitude of the commanded stator current is compared to this hysteresis.

If the commanded stator current exceeds the current threshold, a first command is produced, as indicated at step 120. For example, if the commanded stator current exceeds the current threshold, the controller 31 produces a gate voltage command ($V_{gate}^*$) for an increased gate voltage ($V_{high}$) (e.g., $V_{gate}^* = V_{high}$). The inverter circuit 30 receives the increased gate voltage (e.g., from the gate drive circuit 34) in response to the first command and provides the output voltage in response to the increased gate voltage. If the commanded stator current does not exceed the current threshold, a second command is produced (e.g., by the controller 31), as indicated at step 125. For example, if the commanded stator current does not exceed the current threshold, the controller 31 produces a gate voltage command ($V_{gate}^*$) for a decreased or nominal gate voltage ($V_{low}$) (e.g., $V_{gate}^*=V_{low}$). The inverter circuit 30 receives the nominal gate voltage in response to the second command and provides the output voltage in response to the nominal gate voltage. The second command is also produced if the dissipation conditions are not met or if the commanded output frequency exceeds the frequency threshold.

In another embodiment, a third command is produced by the controller 31 if the commanded output frequency of the inverter exceeds another pre-determined frequency threshold. The inverter circuit 30 receives a decreased gate voltage in response to the third command and provides the output voltage in response to the decreased gate voltage. The decreased gate voltage may be less than the nominal gate voltage, or simply the nominal gate drive voltage. Employing lower gate voltages (e.g., lower than the nominal gate voltage) under conditions of higher speeds of the electric motor 12 and elevated high-voltage supply conditions (e.g., elevated DC supply voltage levels) permits an increased operating margin of the switches 18, 20, 22, 24, 26, and 28, particularly under fault conditions.

In general, the gate voltage is increased if the speed of the electric motor 12 is less than a pre-determined threshold, in one embodiment. For example, the inverter circuit 30 is configured to receive a first gate voltage and has a first current capacity associated with the first gate voltage. The first gate voltage may be increased to a second gate voltage if the speed of the electric motor 12 is less than the pre-determined threshold (e.g., if a rotational speed of the electric motor 12 is less than about 3 Hz). The inverter circuit 30 produces an output voltage in response to the second gate voltage and provides the output voltage to the electric motor 12 to drive the same. When the speed of the electric motor 12 is less than the pre-determined threshold, the first current capacity is reduced (e.g., as a result of restricting the electrical output of the inverter circuit 30 to account for the uneven distribution of thermal stresses among the switches 18, 20, 22, 24, 26, and 28). By increasing the first gate voltage to the second gate voltage, the first current capacity is increased to a second current capacity.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for controlling an inverter, the inverter operable to provide an output voltage to an electric motor, the method comprising:
   determining if a commanded output frequency of the inverter does not exceed a first pre-determined threshold;
   determining, if the commanded output frequency does not exceed the first pre-determined threshold, if a commanded stator current of the inverter exceeds a second pre-determined threshold;
   producing a first command if the commanded stator current exceeds the second pre-determined threshold, the inverter receiving a first gate voltage in response to the first command and providing the output voltage in response to the first gate voltage; and
   producing a second command if the commanded stator current does not exceed the second pre-determined threshold, the inverter receiving a second gate voltage in response to the second command and providing the output voltage in response to the second gate voltage, the first gate voltage greater than the second gate voltage.

2. A method according to claim 1, wherein the inverter has an inverter temperature and is operable with a direct current (DC) supply voltage; and wherein, prior to the step of determining if a commanded output frequency of the inverter does not exceed a first pre-determined threshold, the method further comprises:
   determining if the DC supply voltage is not elevated; and
   determining if the inverter temperature does not exceed a pre-determined temperature; and
   wherein the step of determining if a commanded output frequency of the inverter does not exceed a first pre-determined threshold comprises determining, if the DC supply voltage is not elevated and if the inverter temperature does not exceed a pre-determined elevated temperature, if the commanded output frequency of the inverter does not exceed the first pre-determined threshold.

3. A method according to claim 2, wherein the step of determining if the inverter temperature does not exceed a pre-determined temperature comprises determining if the inverter temperature does not exceed an elevated temperature, the elevated temperature based on a pre-determined dissipation of one or more losses associated with the inverter at the elevated temperature.

4. A method according to claim 1, further comprising:
   producing the second command if the commanded output frequency does not exceed the first pre-determined threshold; and
   producing the second command if the commanded stator current exceeds the second pre-determined threshold.

5. A method according to claim 1, wherein the inverter has a first current capacity based on the first gate voltage; and wherein the step of producing the first command comprises increasing the first current capacity to a second current capacity, the second current capacity based on the second gate voltage, the first current capacity greater than the second current capacity.

6. A method according to claim 1, wherein the step of determining if a commanded stator current of the inverter exceeds a second pre-determined threshold comprises comparing an amplitude of the commanded stator current to a threshold current, the threshold current having a hysteresis.

7. A method according to claim 1, wherein the step of determining if a commanded output frequency of the inverter does not exceeds a first pre-determined threshold comprises determining if the commanded output frequency does not exceed about 3 Hz.

8. An inverter for providing an output voltage to an electric motor and configured to receive a commanded output frequency and a commanded stator current, the inverter comprising:

a gate drive circuit having an input and having an output configured to couple to a switch network, the gate drive circuit configured to provide a gate voltage to the switch network, the switch network operable to produce the output voltage in response to the gate voltage; and a controller coupled to the input of the gate drive circuit, the controller configured to:

modify the gate voltage based on a speed of the electric motor;

determine if the commanded output frequency does not exceed a second first pre-determined threshold;

determine, if the commanded output frequency does not exceed the first pre-determined threshold, if the commanded stator current of the inverter exceeds a second pre-determined threshold;

produce a first command if the commanded stator current does not exceed the second pre-determined threshold, the switch network receiving a first gate voltage in response to the first command and providing the output voltage in response to the first gate voltage; and produce a second command if the commanded stator current exceeds the second pre-determined threshold, the switch network receiving a second gate voltage in response to the second command and providing the output voltage in response to the second gate voltage, the second gate voltage greater than the first gate voltage.

9. An inverter according to claim 8, wherein the controller is further configured to increase the gate voltage if the speed of the electric motor is less than a pre-determined threshold.

10. An inverter according to claim 8, wherein the controller is further configured to increase the gate voltage if a rotational speed of the electric motor is less than about 3 Hz.

11. An inverter according to claim 8, wherein the controller is further configured to:

produce the first command if the commanded output frequency exceeds the first pre-determined threshold; and produce the first command if the commanded stator current exceeds the second pre-determined threshold.

12. An inverter according to claim 8, wherein the gate drive circuit is configured to receive a positive supply voltage and a common supply voltage; wherein the controller is further configured to increase the positive supply voltage to the gate drive circuit if the speed of the electric motor is less than a third pre-determined threshold; and wherein the gate drive circuit is configured to increase the gate voltage when the positive supply voltage increases.

* * * * *